Jan. 9, 1951 V. S. CONSCHAFTER 2,537,573
CHIROPRACTIC DEMONSTRATING EQUIPMENT
Filed Aug. 23, 1948 5 Sheets-Sheet 2
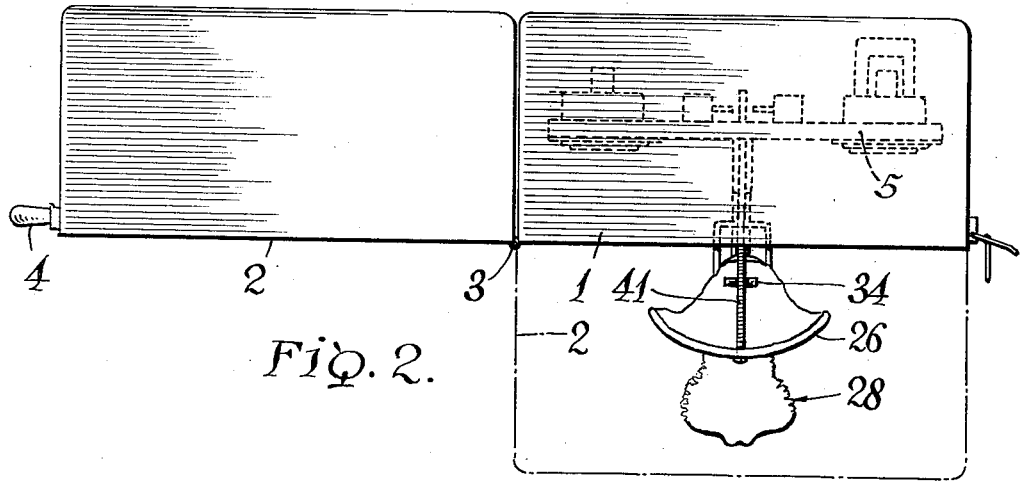
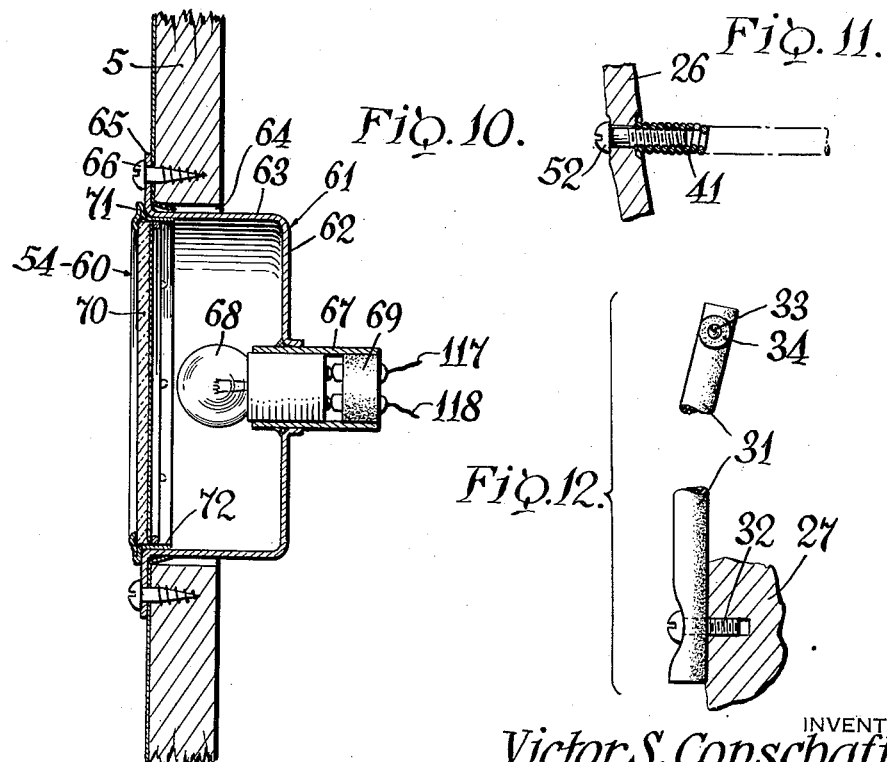
INVENTOR.
Victor S. Conschafter,
BY John Lowers.
ATTORNEY.

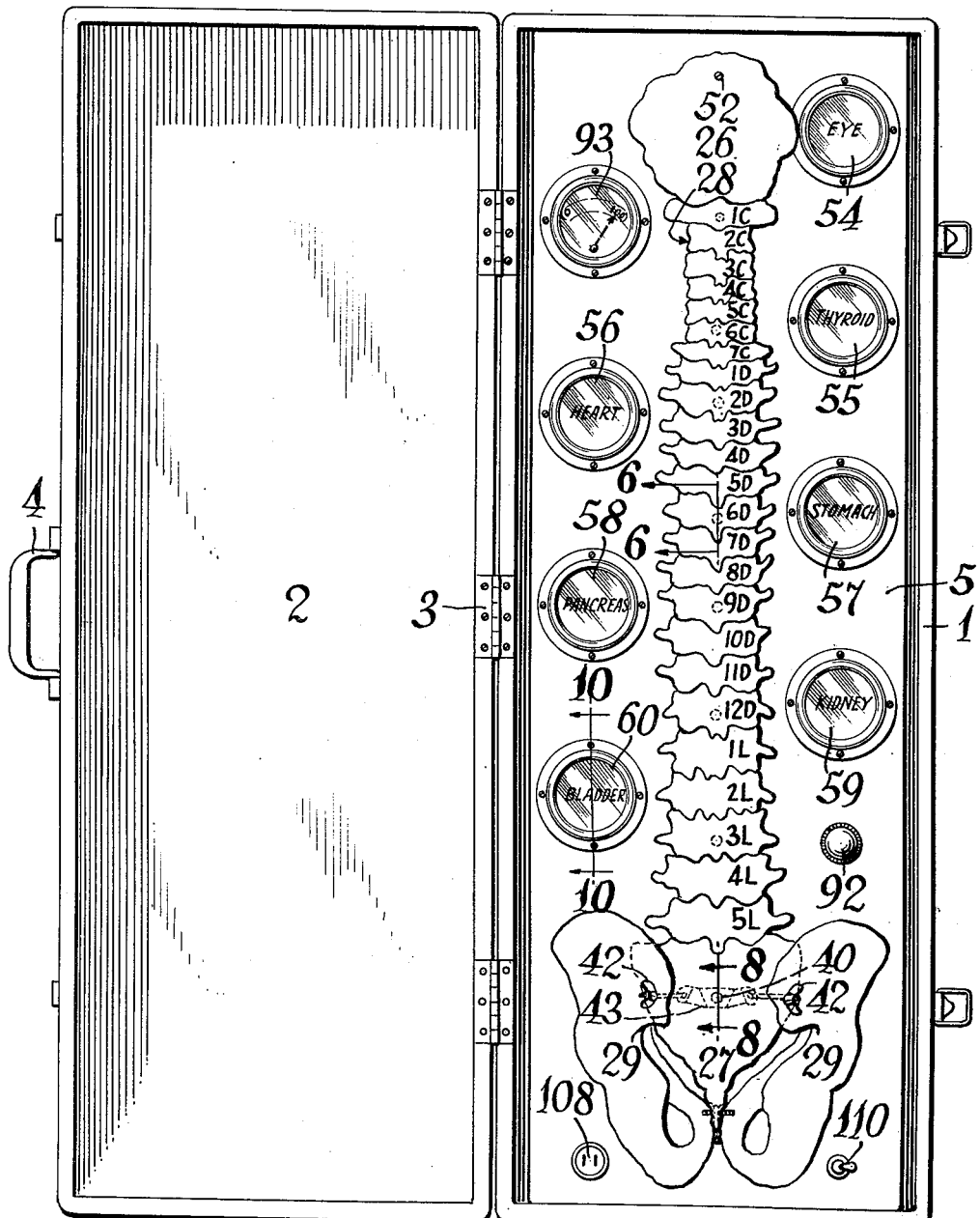

Jan. 9, 1951 V. S. CONSCHAFTER 2,537,573
CHIROPRACTIC DEMONSTRATING EQUIPMENT
Filed Aug. 23, 1948 5 Sheets-Sheet 3

INVENTOR.
Victor S. Conschafter,
BY
ATTORNEY.

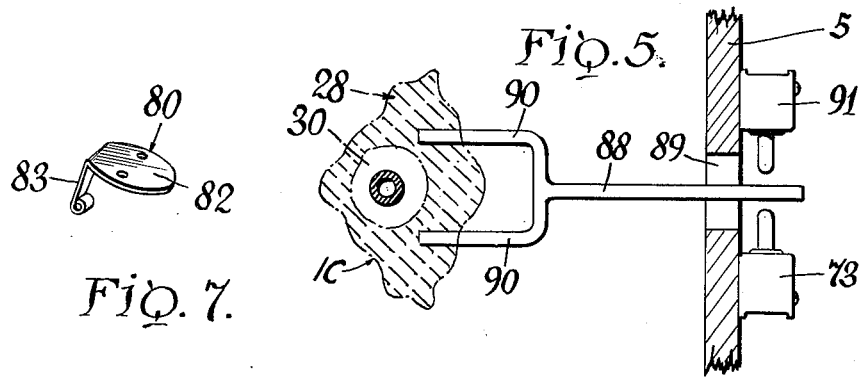
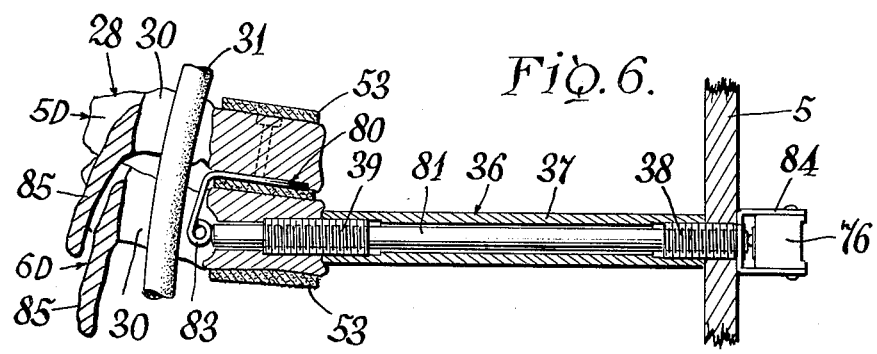
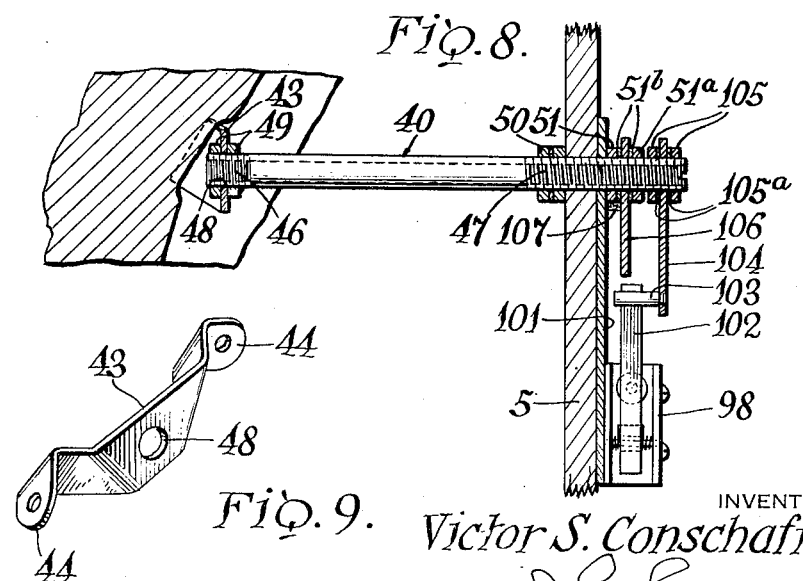

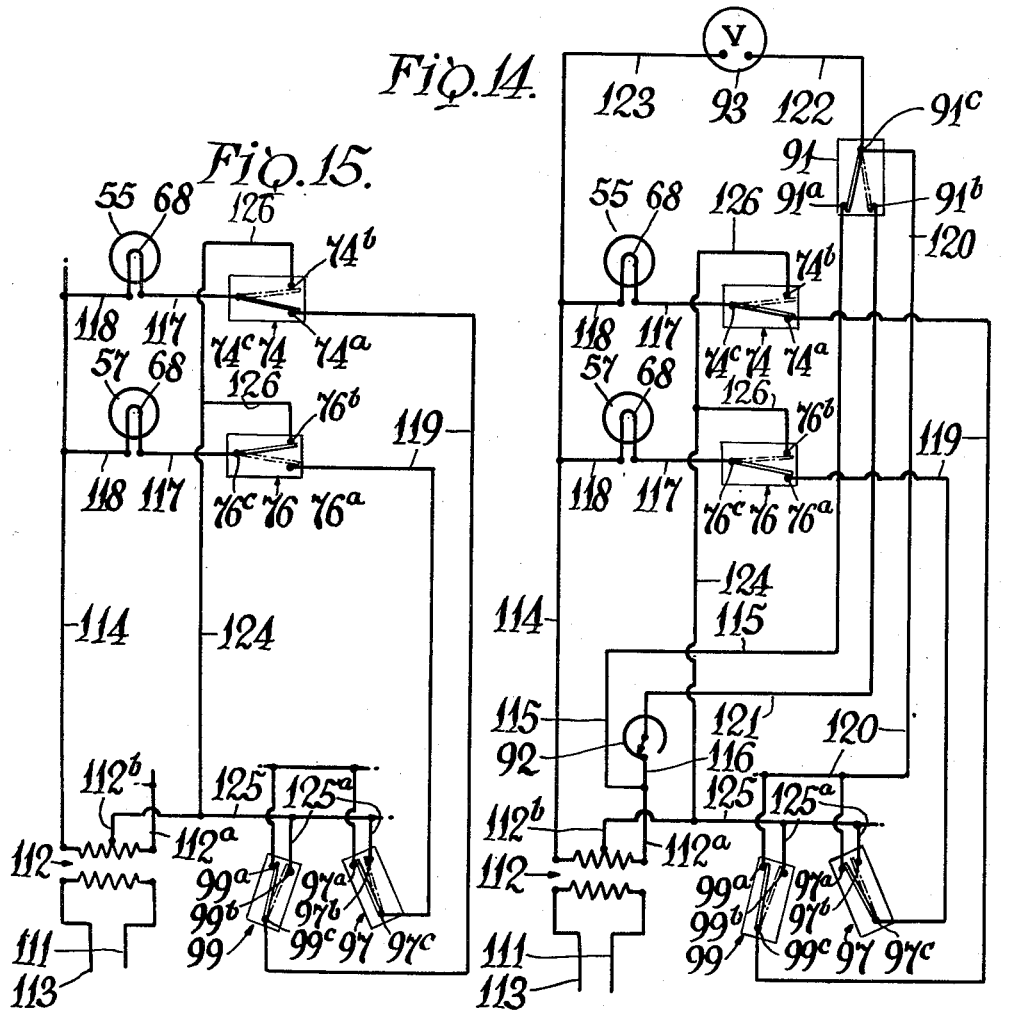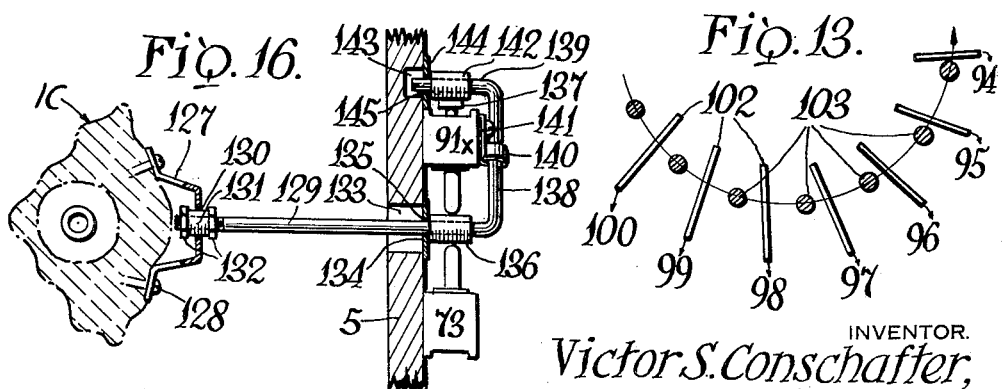

Patented Jan. 9, 1951

2,537,573

UNITED STATES PATENT OFFICE 2,537,573

CHIROPRACTIC DEMONSTRATING EQUIPMENT

Victor S. Conschafter, Buffalo, N. Y.

Application August 23, 1948, Serial No. 45,710

11 Claims. (Cl. 35—17)

This invention relates to improvements in equipment for demonstrating visually and symbolically the adverse neurological effects resultant from the dislocation or subluxation of one or more of the vertebrae of the spine. The equipment is for auxiliary use in chiropractic and is advantageous both in connection with lectures and in demonstrating to patients the lowered efficiency of one or more organs of the body due to some particular spinal deformation.

The improvements relate to equipment of the general type which includes a model spinal column composed of parts which may be referred to as model vertebrae. These parts correspond in sundry respects of form and relation to the vertebrae of the natural spine, are normally maintained in positions corresponding to the normal positions of the vertebrae of a sound natural spine, and are capable of individual displacement movement symbolic of the displacement, i. e., flexing or subluxation, of generally corresponding natural vertebrae. This type of equipment also includes electric lamps which represent particular organs of the body and are severally electrically connected to particular model vertebrae according to the relation in which the body organs receive impulses from the nerves associated with particular natural vertebrae and become of lowered efficiency when the nerves are under pressure or tension as a result of spinal deformation. When the model vertebrae are in their normal positions the lamps glow at full brilliance.

In chiropractic, X-ray photographs are taken of the patient's spinal column, thereby to enable the determination of the particular spinal deformation and the certain identification of the particular dislocated vertebra or vertebrae. In the use of the equipment of the general type above described for demonstration to patients, model vertebrae, corresponding generally to the dislocated vertebrae shown by the X-ray photographs, are individually manipulated, i. e., displaced, according to the teaching of the photographs, thereby substantially to symbolize or reproduce the displacement or subluxation of the natural vertebra or vertebrae. Such manipulation of the model vertebra or vertebrae adversely affects the operation of the electric lamp or lamps representing the affected organ or organs of the body, the change in the operation of the particular lamp or lamps being symbolically indicative of the lowered efficiency of the organ or organs.

The principal object of the invention is to provide in substantial degree for greater accuracy and greater comprehensiveness in the demonstration of adverse neurological effects resulting from spinal deformations.

In the attainment of this object the invention provides the following features of improvement: (1) a series of lamps which normally glow at maximum brilliance and are severally indicative of organs of the body in combination with controlling circuits and controlling switches such that any lamp may be individually dimmed in a fixed degree to symbolize the impairment, resultant from the subluxation of a particular vertebra, of the efficiency of the body organ which it represents, all of the lamps may be simultaneously dimmed to any degree, as determined by the demonstrator, to symbolize the simultaneous impairment, and the degree thereof, of the efficiency of the several body organs due to pressure upon the spinal cord caused by a displacement of the atlas, and any two or more or all of the lamps may be progressively dimmed in a predetermined order in a fixed degree to symbolize the progressive impairment of the efficiency of the body organs due to lineally progressive cord tension caused by the tilting of the sacrum; (2) an operative relationship between all the lamps and the model first cervical vertebra or atlas; (3) an individual operative relationship between the model atlas and the lamp representing the eyes; (4) for the selection of the manipulation of the model atlas whereby the operation of all of the lamps may be simultaneously adversely effected, corresponding to the adverse effects simultaneously upon the principal organs of the body due to one character of displacement of the atlas or the operation only of the lamp representing the eyes may be effected, corresponding to the adverse effect of another character of displacement of the atlas; (5) for regulating the degree to which all of the lamps may be dimmed by the manipulation of the model atlas and for showing graphically to the patient the degree of body organ impairment by an instrument which registers the voltage passing through the lamps; (6) an operative relationship between all of the lamps and the model sacrum such that the lamps are successively dimmed in the ascending order of the vertebrae according to the degree of tilting of the model sacrum, the selection thus provided for being indicative of the impairment of the body organs in the ascending order of the vertebrae according to the degree of tilting (displacement) of the patient's sacrum and the lineally progressive extent of cord tension; and (7) an operative relationship between each lamp and a particular model vertebra whereby the lamps may be individually dimmed by the manipulation of the corresponding model vertebra in order to indicate to the patient the impairment of a particular organ due to the subluxation of one or more of the vertebrae of the group with which are associated the nerves governing the functioning of the organ.

Further objects are to provide a model spinal column which in mechanical respects, i. e., structural details and capacity for relative dislocation of the model vertebrae, simulates the natural spinal column with the greatest practical degree of fidelity; to provide a model spinal column of a desirable and substantially greater degree of flexibility than heretofore and wherein the normal outline, corresponding to the normal outline of the average healthy spinal column, is maintained by supporting parts projecting forward from a supporting base; to provide novel electric switch means for the lamp controlling circuits which switch means is under the control of particular model vertebrae and at all times is operative to maintain the operation of the several lamps, the switch means cooperating selectively with circuits which provide for the operation of the lamps at full brilliance or at a diminished degree of brilliance accordingly as a model vertebra may be in its normal position or may be manipulated to a displaced position; to provide for the correlation of the circuits for the operation of the lamps at full brilliance or simultaneously at a diminished and variable degree of brilliance with switch means under the control of the model atlas; and to provide for the correlation of the circuits for the operation of the lamps at full brilliance or at diminished brilliance with switch means under the control of the model sacrum, such means being operative to cause the operation of the lamps at a diminished brilliance in a prescribed order of succession.

The equipment is light in weight whereby it may readily be carried from place to place and for this purpose it is preferably permanently mounted in a portable box or cabinet composed of hingedly connected sections.

An embodiment of the invention is illustrated in the accompanying drawings wherein:

Figure 1 is a view with the sections of the cabinet open for the display of the equipment to the students or patients. This figure shows the posterior face of the model spinal column and also shows the windows which are illuminated by the lamps and the instrument which registers the voltage in the lamp circuits.

Figure 2 is a top plan view with the sections of the cabinet open as in Figure 1.

Figure 5 is a detail horizontal section on the line 5—5 of Figure 3, looking in the direction of the arrows.

Figure 6 is a detail vertical section on the line 6—6 of Figure 1, looking in the direction of the arrows.

Figure 7 is a perspective view of any one of the switch elements which are carried by certain of the model vertebrae.

Figure 8 is a detail vertical section on the line 8—8 of Figure 1.

Figure 9 is a perspective view of a bracket part which is used for the connection of the model sacrum to the model ilia.

Figure 10 is a detail vertical section of one of the lamps and associated parts, including the window through which the illumination is visible, the other lamps and their associated parts being similar in construction and arrangement.

Figure 11 is a detail sectional view showing the connection of a stabilizing spring to the model occipital bone.

Figure 12 is a detail elevation, partly broken away, of a flexible model spinal cord part which extends through openings in the model occipital bone and the model vertebrae and is connected at its lower end to the model sacrum, this part serving to maintain the assembly of the various elements of the model spinal column.

Figure 13 is a developed diagrammatic view showing the relation of a series of sacrum-operated switch actuating posts to corresponding micro-switches, the normal spacing of the posts and the fingers of the corresponding micro-switches being exaggerated in order to promote clarity of illustration.

Figure 14 is a detail diagram of the high voltage lamp circuits.

Figure 15 is a detail diagram of the low voltage lamp circuits.

Figure 16 is a view similar to Figure 5 but showing a modification of the atlas operated switch actuating means.

Figure 3:
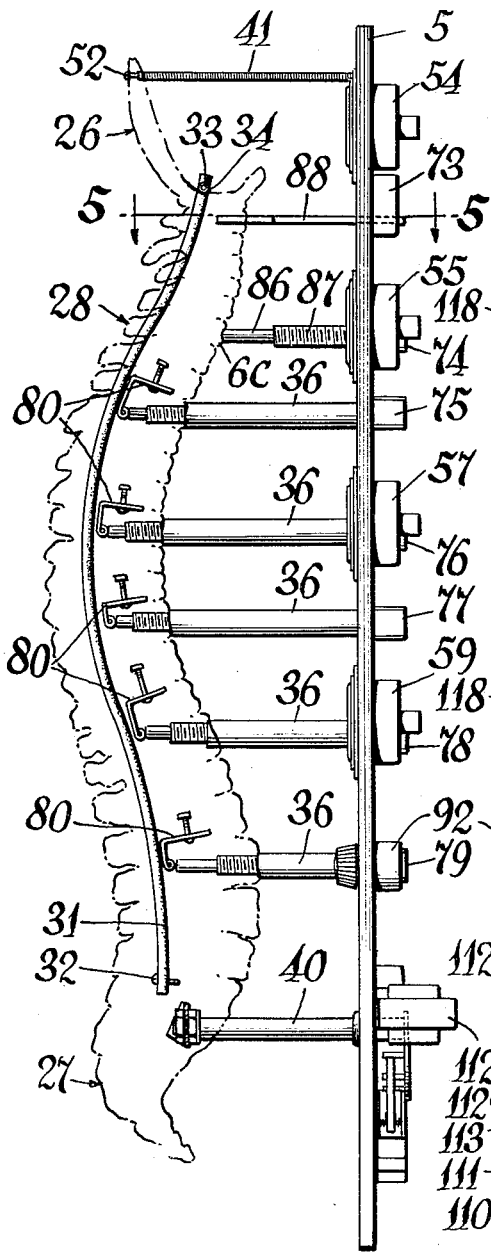
Figure 3 is a view in side elevation showing the supporting base and the parts which it carries, together with the parts which are associated with the model vertebrae, the latter being shown in broken lines.

The equipment is mounted in a box or cabinet composed of half sections 1 and 2 hingedly connected at 3, the section 2 serving as a cover and being provided with a handle 4 by which, when the sections are closed and latched together, the equipment may be conveniently carried from place to place. The elements of the equipment are mounted upon a panel 5 which provides a supporting base and is suitably fitted in the section 1 in spaced relation to its rear wall, thereby to provide a suitable clearance to accommodate the parts mounted adjacent the rear face of the panel.

The model spinal column includes separate parts fashioned to conform in respects of structural shape and outline to the parts of the human spinal column. These model parts are made of any suitable light weight material, preferably a suitable molded plastic material and simulate the occipital bone, the vertebrae and the sacrum to which latter it is preferred to connect model ilia. The model parts are maintained in an assembled relation which conforms structurally and in outline to the healthy average spinal column. The model occipital bone is designated generally as 26, the model sacrum as 27, the model vertebrae as 28 and the model ilia as 29.

The model vertebrae 28 are distinguished by the letters "C," "D," and "L" as cervical, dorsal and lumbar. In descending order they are individually distinguished as 1C, 2C, 3C, 4C, 5C, 6C, 7C, 1D, 2D, 3D, 4D, 5D, 6D, 7D, 8D, 9D, 10D, 11D, 12D, 1L, 2L, 3L, 4L, and 5L, the model occipital bone being immediately above and adjacent the model vertebrae 1C and the model sacrum 27 being immediately below and adjacent the model vertebrae 5L. Since the model vertebrae 28 conform in respect of structural shape and outline to the corresponding natural vertebrae it will be understood that adjacent model vertebrae have an articulation which simulates the articulation of natural vertebrae. The model vertebrae 28 are each formed between their upper and lower faces with openings 30 (Figure 6) which generally simulate the openings provided by the neural arches in the corresponding natural vertebrae and which in adjacent model vertebrae are in registry, just as the neural arch openings of adjacent natural vertebrae are in registry. The openings 30 as a series provide a passage extending through the model spinal column and, due to the facts that the model spinal column has the outline of the average healthy natural spinal column and the model vertebrae have articulations simulating the articulations of the vertebrae of the natural spinal column, the passage provided by the openings 30 simulates the neural canal of the natural spinal column.

The model neural canal passage extends through the occipital bone and at its lower end is open to the chamber of the model sacrum, in these respects continuing the simulation of the neural canal of the natural spinal column. In the model spinal column the spinal cord is simulated by a tie element which extends through the model neural canal beyond the vertebrae and aids in maintaining the model parts, namely occipital bone, vertebrae and sacrum, in accurately assembled relation. The tie element preferably consists of a flexible tube 31, preferably composed of suitable plastic material. At its lower end the tube 31 is suitably secured to the inner face of the model sacrum 27, for example by a screw 32 as shown in Figure 12, and at its upper end is suitably anchored to the model occipital bone, for example by a cross pin 33 which preferably carries anti-wear sleeves 34 formed of the same plastic material as the tube 31 and which has a bearing against the upper face of the base of the occipital bone.

The model spinal column is at once supported by the panel 5 and maintained in an outline, viewed laterally, which conforms to the outline of the healthy spinal column of the average individual. The principal supporting elements are a series of rigid connections 36 secured fixedly to the panel 5 and to certain of the model vertebrae. Each connection 36 preferably consists of a tubular spacing element 37 and sleeves 38 and 39 externally threaded and fitted in and projecting beyond the ends of the element 37, the sleeves 38 being threaded into openings which extend between the front and back faces of the panel 5 and the sleeves 39 being threaded into recesses in the model vertebrae which cooperate with the connections 36. The spacing elements 37 bear at their ends against the front face of the panel 5 and against the inner faces of the model vertebrae to which the sleeves 39 are connected. The supporting elements 36 may be connected to various model vertebrae suitably spaced. In the embodiment disclosed they are connected to the model vertebrae 2D, 6D, 9D, 12D and 3L. In order to maintain the model spinal column in the outline, viewed laterally, which conforms to outline of the healthy spinal column of the average individual the supporting elements 36 are of appropriate varying length as shown in Figure 3.

Another supporting element 40 rigidly connects the model sacrum 27 and the panel 5. The upper portion of the model spinal column which projects upwardly and beyond the uppermost supporting element 36, i. e. the segment which includes the model vertebrae 1C to 7C inclusive, is maintained in proper outline, viewed laterally, i. e., the outline simulative of that of the corresponding segment of the natural spine, by a spring 41 which is under light tension and which has its inner end secured to the panel 5 and its outer end secured to the upper end of the posterior portion of the model occipital bone 26.

The model ilia 29 are connected to the model sacrum 27 at each side thereof by bolt and wing-nut fastenings 42 (Figure 1), the heads of the bolt elements of such fastenings serving to secure a strap 43 extending transversely of the model sacrum 27 adjacent its inner face and having apertured terminal ears 44 through which the shanks of the bolt elements pass. Thereby the strap 43 is anchored in position.

The supporting element 40 consists of a stem having at its ends series of threads 46 and 47 respectively and projecting through a centrally located opening 48 in the strap 43 and also through an opening in the panel 5. Nuts 49 are mounted upon the threaded portion 46 at each side of the strap 43 and are tightened to bear securely against it whereby when the model sacrum 27 is manipulated, i. e., tilted laterally, the stem 40 will be turned about its axis through a corresponding degree. Nuts 50 and 51 are mounted upon the threaded portion 47 at each side of the panel 5 and serve to hold the stem 40 against axial displacement relatively to the panel. However the nuts 50 and 51 are not tightened to a degree which will interfere with the easy turning movement of the stem consequent to the manipulation of the model sacrum. The stem 40 is of a length whereby the model sacrum and adjacent model vertebrae have an outline, viewed laterally, conforming to the outline of the corresponding elements of the normal healthy human spinal column, the stem 40 in this respect serving a function the same as one of the functions of the supporting elements 36.

The spring 41 and the supporting elements 36 and 40 are located in a common vertical plane which extends centrally of the model spinal column between its posterior and anterior faces. The spring 41 is helically wound and the convolutions at its outer end securely engage the threads of a screw 52 (Figure 11) fitted in an opening in the model occipital bone with its head bearing against the outer face of the model occipital bone. The inner end of the spring 41 is secured to the panel 5 in any suitable manner. The spring 41 as thus connected to the model occipital bone maintains it in the angular relation to the rest of the model spinal column which conforms to the angular relation of the natural occipital bone.

The model spinal column is completed by a series of spacing elements located between the anterior portions of adjacent model parts, i. e., between adjacent vertebrae, between the vertebra 1C and the occipital bone 26 and between the vertebra 5L and the sacrum 27. The spacing elements are sufficiently shown in Figure 6 and are in the form of discs 53 having an appropriate measure of resiliency and preferably composed of felt. The discs 53 are secured by any suitable cement or adhesive to the adjacent faces of the parts between which they are interposed and their form and arrangement simulates the intervertebral discs of the human spine. In the model spinal column the discs 53 by virtue of their resiliency serve the functions of maintaining the parts in proper relation and of returning to normal positions the particular model vertebra or vertebrae which may be manipulated to effect the dimming of the brilliance of the lamps indicative of the organs of the body.

The representation of the organs of the body selected for the purpose of demonstration is provided by a series of electric lamps. For the purpose of demonstration, the representations of seven body organs are suggested, namely the eyes, thyroid, heart, stomach, pancreas, kidney and bladder, these being the important body organs which are principally affected by nerve pressure or tension resulting for various spinal dislocations. The lamps representative of these organs are of similar construction and are designated 54, 55, 56, 57, 58, 59 and 60, one of them being shown in detail in Figure 10. Each lamp consists of a casing 61 having a rear wall 62 and a cylindrical wall 63 which is located within an opening 64 in the panel 5 and is provided with an out-turned flange 65 overlying the front face of the panel 5 and attached to it by fastening screws 66. The rear wall 62 is provided with a centrally located sleeve 67 which serves for the mounting of the electric bulb 68 and the contact plug 69. The front wall of the casing 61 is provided by a window 70 of glass or other transparent material fitted in an annular frame 71 having an inwardly projecting annular flange 72 which has a snug fit within the cylindrical wall 63, the frame 71 being conveniently removable from the wall 63 whenever it may be necessary to replace a burned-out bulb 68. The window 70 of each lamp preferably bears a suitable indication of the organ which the lamp represents. In practice it has been found desirable to provide such indication by means of a translucent picture of the organ, the picture being suitably applied to the window 70. It has been deemed unnecessary to reproduce these pictures in the drawings, the representation of the various organs being sufficiently indicated by applying the names of the organs to the several lamps. Thus the four lamps 54, 55, 57 and 59 at the right of Figure 1 are respectively marked "eye," "thyroid," "stomach" and "kidney" and the three lamps 56, 58 and 60 at the left of Figure 1 are respectively marked "heart," "pancreas" and "bladder."

The illumination of the lamps is individually controlled from certain particular model vertebrae. Thus the illumination of the lamp 54 representing the eye is individually controlled by the first cervical or atlas 1C; of the lamp 55 representing the thyroid by the sixth cervical 6C; of the lamp 56 representing the heart by the first dorsal 1D; of the lamp 57 representing the stomach by the fifth dorsal 5D; of the lamp 58 representing the pancreas by the eighth dorsal 8D; of the lamp 59 representing the kidney by the eleventh dorsal 11D; and of the lamp 60 representing the bladder by the second lumbar 2L. The similitude of the model spinal column to the human spinal column is enhanced by the fact that the model vertebrae for controlling the illumination of the lamps correspond generally to the vertebrae of the human spinal column from which emanate the nerves which convey impulses to the particular body organs represented by the lamps. Thus a particular dislocation of the atlas causes pressure upon the nerves that lead to the eyes. For the same reason subluxation of the fifth or sixth cervical impairs the efficiency of the thyroid; of the first and second dorsal the efficiency of the heart; of the fifth, sixth and seventh dorsal the efficiency of the stomach; of the eighth dorsal the efficiency of the pancreas; of the eleventh dorsal the efficiency of the kidney or suprarenal glands; and of the second and third lumbar the efficiency of the bladder. The lowered efficiency of any of the body organs represented in the equipment due to the subluxation of any of the natural vertebrae above mentioned may be fairly demonstrated by manipulation of the appropriate lamp-controlling model vertebrae.

In the normal position of all of the parts of the model spinal column, representative of the healthy condition of the normal human spinal column, the electric bulbs 68 glow at full brilliance, being in each instance in a circuit of maximum voltage, e. g., six volts. When any of the controlling model vertebrae is manipulated to exemplify the subluxation of the corresponding natural vertebrae the illumination of the corresponding lamp 68 is dimmed. This is accomplished by transferring the lamp 68 from the normal circuit of maximum voltage to a temporary circuit of lower voltage, e. g., three volts. For the control of the several lamps with respect to their individual operating circuits suitable switches are mounted upon the rear face of the panel 5 as shown diagrammatically in Figure 4, these being preferably micro-switches of a standard type and being self-operating to close the normal circuits of maximum voltage. Thus the lamp 54 is individually controlled by a switch 73; the lamp 55 by a switch 74; the lamp 56 by a switch 75; the lamp 57 by a switch 76, the lamp 58 by a switch 77; the lamp 59 by a switch 78; and the lamp 60 by a switch 79.

The actuating means for the switches 75, 76, 77, 78 and 79 include actuating elements which are carried by the controlling model vertebrae and slidable companion elements which directly engage the movable parts of the switches. The slidable companion elements of the switch actuating means are preferably carried by the supporting elements 36. In providing for the operative relation of the elements of the switch actuating means the supporting elements 36 are connected to the several model vertebrae which are located immediately below the controlling model vertebrae. Thus the elements 36 are severally connected to the sixth cervical 6C, second dorsal 2D, sixth dorsal 6D, ninth dorsal 9D, twelfth dorsal 12D and third lumbar 3L.

The actuating means for the switches 75, 76, 77, 78 and 79 are similar in construction and a showing of one will suffice for all. The construction of the actuating means is shown in Figure 6, the model vertebrae selected for illustration being the fifth and sixth dorsals 5D and 6D, the fifth dorsal 5D controlling the operation of the switch 76 for the individual circuits of the lamp 57.

The switch actuating means, as shown in Figure 6, includes an actuating element 80 and a slidable companion element 81. The actuating element 80 is shown in detail in Figure 7 and consists of an attachment base 82 having a suitably formed downwardly projecting finger 83. The base 82 is positioned adjacent the lower face of the model fifth dorsal vertebra 5D and is pinned or otherwise secured to this part, the base 82 being located between the model vertebra and the felt disc 53 which is interposed between the model vertebrae 5D and 6D. The disc 53 is of greater diameter than the base 82 and its marginal portion which projects beyond the base 82 is secured by a suitable cement or adhesive to the model vertebra 5D, its portion which is located under the base 82 being similarly secured to the base. The finger 83 projects downward into the neural canal opening 30 of the model sixth dorsal vertebra 6D. The sleeve 38 of the supporting element 36 carries adjacent the rear face of the panel 5 a bracket 84 for the support of the switch 76. The slidable element 81 is in the form of a rod slidably fitted in the spacing element 37 and the sleeves 38 and 39. The rod 81 projects beyond the sleeves 38 and 39 with its rear end projecting beyond the bracket 84 and in engagement with the movable part of the switch 76 and its front end projecting through an opening in the model vertebra 6D and into the neural canal opening 30 where it has contacting engagement with the lower end of the finger 83.

The model vertebrae are severally provided with extensions 85 (Figure 6) which project angularly and downwardly from their posterior faces and are preferably shaped and proportioned to simulate the spinous process of the natural vertebrae, these extensions being schematically suggested in Figure 1. The displacement of the switch controlling model vertebrae 1D, 5D, 8D, 11D and 2L to effect the dimming of the lamps which they respectively control involves their angular or rocking movement about a transverse axis located behind the neural canal opening 30. This displacement symbolizes and substantially reproduces the subluxation of the natural vertebrae of the dorsal and lumbar segments and is conveniently effected by applying a downward pull to the extension 85 of the model vertebra to be manipulated, the felt disc 53 located under such vertebra yielding to permit its displacement and the finger 83 moving inward and effecting an inward movement of the element 81 whereby the corresponding micro-switch is operated to cut in the lamp circuit of reduced voltage with a resultant dimming of the brilliance of the corresponding lamp. The degree of rocking movement of the vertebra and of inward movement of the element 81 necessary for the dimming of the lamp is very slight; and the rocking displacement of the controlling vertebra may be effected by a very slight manual effort, barely beyond a mere touch. The controlling vertebra is manually held displaced for such period as may be desired for exhibiting the dimming of the brilliance of the corresponding lamp. Thereupon the demonstrator releases the extension 85 and the discs 53, located adjacent the controlling vertebra, operate by their inherent resiliency to return the vertebra to its normal position. When the vertebra is so returned the element 81 is moved outward by the action of the micro-switch, in its outward movement following the outward or return movement of the finger 83, and the micro-switch by the same action which effects the outward or return movement of the element 81 also cuts in the lamp circuit of maximum voltage with a resultant normal maximum brilliance of the corresponding lamp.

The subluxation of the vertebrae of the cervical segment of the natural spine, for anatomical reasons which are of no present interest, differs somewhat from the subluxation of the remaining vertebrae, being more in the nature of a shifting or rectilinear displacement. The construction or "architecture" of the model spinal column substantially conforms to the natural spinal column in this respect and permits exemplification of the rectilinear subluxation of the cervical vertebrae below the atlas. For this reason the switch actuating means under the control of model vertebra 6C and which controls the switch 74 for the individual circuits of the lamp 55 differs from the actuating means for the control of the switches of the lamps 56, 57, 58, 59 and 60 and which are operated by angular or rocking movement of the vertebrae, all as above described.

The switch 74 is operated to cut in the low voltage circuit of the lamp 55 by a slidable rod 86 which functions similarly to the rod 81 of the switch actuating mechanism previously described. The rod 86 is slidably mounted in a sleeve 87 which is fitted, as by threading, in an opening in the panel 5, the connection of the sleeve 87 to the panel 5 being similar to the connections of the sleeves 38 to the panel. The sleeve 87 projects beyond the front face of the panel 5 to an extent sufficient to provide adequate guiding support for the rod 86. The rod 86 at its inner end has contacting engagement with the movable element of the switch 74 and at its outer end is closely adjacent or in abutting contact with the anterior face of the controlling model cervical vertebra 6C. The rod 86 is moved inward to operate the switch 74 to cut in the low voltage lamp circuit by finger pressure upon the vertebra 6C, the movement of which is rectilinear and of very slight extent. The finger pressure upon the vertebra 6C to effect its movement is of very slight degree, no more than in the instances described, and is continued for such period as may be desired for exhibiting the dimming of the lamp 55. When it is desired to restore the lamp 55 to normal maximum brilliance the pressure upon the vertebra 6C is released, the discs 53 above and below and connected to it acting by their inherent resiliency to return the vertebra to its normal position. When the vertebra 6C is so released and returned the micro-switch effects the return of the rod 86 to its normal position, causing it to follow the return movement of the vertebra. The micro-switch, by the same action which effects the outward or return movement of the rod 86, also cuts in the lamp circuit of maximum voltage with a resultant normal maximum brilliance of the lamp 55.

In the model spinal column, in conformity to the structure of the natural spinal column, the atlas 1C is tiltable laterally, i. e., horizontally with respect to the second cervical vertebrae or axis 2C. The displacement of the atlas which adversely effects the eyes is exemplified in the model spinal column by a clock-wise movement of the atlas, Figure 5 of the drawing being considered. For this reason the switch actuating means under the control of the atlas and which controls the switch 73 for the individual circuits of the lamp 54 differs from the actuating means previously described. The actuating means for the switch 73 consists of a horizontal arm 88 rigidly secured to the atlas and projecting rearward from its anterior face through an opening 89 in the panel 5. The arm 88 may be secured to the atlas in any suitable manner. As shown and preferred it is provided at its front end with forwardly projecting fingers 90 which are rigidly embedded and secured in the atlas, this attachment being conveniently effected during the molding of the atlas. The portion of the arm 88 which projects rearward behind the panel 5 adjoins the movable element of the switch 73. The atlas is moved clock-wise by a slight finger pressure and as a result of such movement the arm 88 engages the movable part of the switch 73 and effects its operation to cut in the low voltage circuit of the lamp 54 with resultant dimming of the illumination. When the dimming of the lamps has been exhibited for a suitable period the finger pressure upon the atlas is released and the atlas is returned to its normal position by the resilient action of the adjoining discs 53 aided by the light tension of the spring 41, the switch 73 being thereupon self-operating to cut in the high voltage circuit of the lamp 54 whereby the lamp will glow with its normal maximum brilliance.

In many cases the subluxation of the atlas is such as to put pressure of varying degree upon the main nerve trunk, i. e. the spinal cord, with the result that the efficiency of all of the body organs is impaired in corresponding degree.

In order that this condition may be exemplified provision is made for changing the operation of the bulbs 68 of the several lamps from the normal high voltage (i. e. six volts) circuit to a special circuit in which the voltage may be reduced by the demonstrator to any extent desired from the maximum of six volts. The common normal high voltage circuit of the bulbs 68 and the special circuit in which the voltage may be progressively reduced are under the control of a micro-switch 91 which is operative automatically to close the normal high voltage circuit and which is operated by actuating means to cut in the special circuit. The switch 91 is mounted upon the rear face of the panel 5 in adjacency to the switch 73 and is actuated to cut in the special circuit by the arm 88, the portion of which that projects behind the panel normally has a medium position (Figure 5) between the movable elements of the switches 73 and 91.

The special circuit includes a suitable standard rheostat 92 (Figures 1 and 4) and a voltmeter 93 which is preferably located near the upper end of the panel 5 and is also included in the normal high voltage circuit of the several lamps. The voltmeter is preferably graduated in terms of percentage, i. e. 0 to 100, and when the lamps are operating at full brilliance in either the normal or the special circuit the reading on the voltmeter will be "100%."

In the exemplification of the adverse results of the pressure of the atlas upon the spinal cord the atlas is moved counter-clockwise, Figure 5 of the drawing being considered, by a slight finger pressure. As a result of such movement the arm 88 engages the movable part of the switch 91 and effects its operation to cut in the special circuit, the rheostat 92 being fully open at the time whereby the bulbs 68 receive the maximum voltage, i. e. six volts. The rheostat is then adjusted to reduce the voltage to a degree at which the dimming of the lamps will be in degree comparable to the impairment of the efficiency of the body organs according to the degree of pressure of the atlas upon the spinal cord as determined by means of any appropriate pathological instrument. When the rheostat is so adjusted the reading on the voltmeter will be lowered in corresponding degree. For example, if the rheostat be adjusted to reduce the voltage in the special circuit to four volts, the reading on the voltmeter will be "66%" which is indicative of the fact that the lamps are glowing at two-thirds of their normal brilliance and exemplify an impairment of the body organs of the order of 33%.

When the dimming of all of the lamps by the adjustment of the rheostat has been exhibited for a suitable period the finger pressure on the atlas is released and the atlas is returned to its normal position by the resilient action of the adjoining discs 53 aided by the light tension of the spring 41, the switch 91 thereupon being self-operating to cut in the normal high voltage circuit of the lamps and the voltmeter at such a time registering "100%."

In the natural spinal column the displacement of the sacrum is usually a tilting displacement about an axis extending between the anterior and posterior faces. In the model spinal column the simulation of such tilting displacement is provided for by the stem 40 which serves as the axis about which the sacrum may be tilted, the clockwise movement of the model sacrum about the axis 40 exemplifying the displacement in either direction of the natural sacrum as shown by the X-ray photograph. In such photograph the degree of tilting of the sacrum can be readily determined by comparison of the positions of the ilia with the cross measuring lines provided on the negative. In this respect the fidelity of the simulation is enhanced by the provision of the model ilia 29, the model sacrum being tilted through a degree substantially corresponding to the showing of the photograph.

The tilting of the natural sacrum imposes lineally progressive tension upon the spinal cord beginning with the lumbar segment. If the degree of tilt be sufficient the tension progresses successively into the dorsal and cervical segments. It follows that the efficincy of the body organs is impaired in the same relation, i. e. the bladder, followed by the kidney, pancreas, stomach, heart, thyroid and eye in the order named. In order to exemplify these adverse effects a series of micro-switches are under the control of the model sacrum 27. In the normal position of the model sacrum, corresponding to the normal position of the sacrum of the healthy spinal column, these micro-switches are in the normal high voltage circuit which provides for the full brilliance of the several lamps indicative of the full efficiency of the body organs. The control of these switches is effected by corresponding actuating means which, in accordance with the degree of tilting of the model sacrum, operate the switches in succession to cut in the low voltage circuits of the several lamps and effect their dimming, the succession being the bladder lamp 60, the kidney lamp 59, the pancreas lamp 58, the stomach lamp 57, the heart lamp 56, the thyroid lamp 55 and the eye lamp 54.

Figure 4:
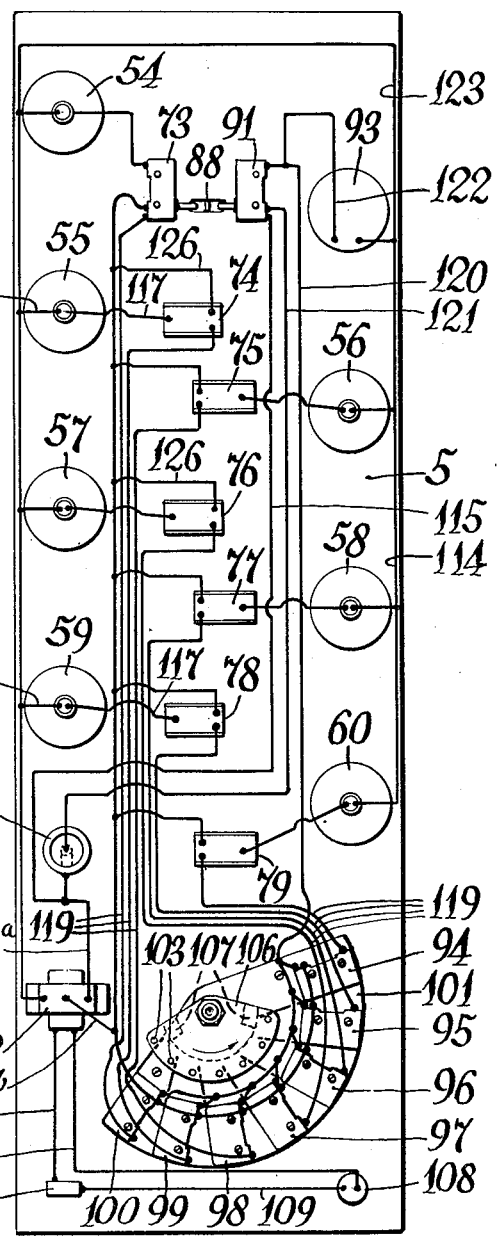
Figure 4 is a rear elevation of the supporting base and various parts mounted adjacent its rear face. This figure also includes wiring diagrams of the various electrical circuits.

The micro-switches under the control of the model sacrum are arranged in successive order along the arc of a circle and are operated successively in the clockwise order of their succession, Figure 4 of the drawing being considered, to cut in the low voltage circuits of the several lamps. In the order of their operation for this purpose these switches are designated 94, 95, 96, 97, 98, 99 and 100, the switch 94 controlling the bladder lamp 60, the switch 95 the kidney lamp 59, the switch 96 the pancreas lamp 58, the switch 97 the stomach lamp 57, the switch 98 the heart lamp 56, the switch 99 the thyroid lamp 55, and the switch 100 the eye lamp 54. The switches 94 to 100 are preferably mounted upon a supporting plate 101 rigidly secured to the panel 5 adjacent its rear face and having an opening through which the stem 40 extends, the plate 101 extending between the panel 5 and the nut 51.

The movable elements of the several microswitches 94 to 100 are operatively connected to spring biased fingers 102 (Figures 4 and 8) located externally of the switch casings and which cooperate with the actuating means. Such means consists of a series of posts 103, one for each switch, carried by and projecting forward from a plate 104 mounted upon and rigidly connected to the stem 40. The plate 104 has an opening through which the stem 40 passes and its rigid connection to the stem is effected by clamping nuts 105 and lock washers 105a. The spacing of the posts 103 on the plate 104 is such that the several posts will successively engage the corresponding fingers in the clockwise succession of the switches, Figure 4 of the drawing being considered, when the plate is moved with the stem as the latter is turned with the model sacrum during its tilting movement. For this purpose the posts 103 are normally spaced from the corresponding fingers 102 by successive increments in the clockwise order of the switches 94 to 100 as shown diagrammatically in Figure 13.

In the model spinal column the tilting movement of the sacrum to effect the dimming successively of all of the lamps is clockwise as viewed in Figure 1 and the movement of the plate 104 is counter-clockwise as viewed in Figure 4. The tilting movement of the model sacrum is effected by manual pressure and is very slight, being of the order of six degrees and the increments by which the posts 103 are normally spaced from the fingers 102 are proportionately slight. Accordingly, in order to insure accuracy of demonstration and also to facilitate the exhibit of the lamps as dimmed for a suitable period, it is preferred to provide suitable means for braking the turning movement of the stem 40. This means preferably consists of an arm 106 mounted upon and rigidly connected to the stem 40 and one or more shoes 107, preferably composed of blocks of resilient rubber, carried by the arm 106 for engagement with braking effect upon the plate 101. The arm 106 has an opening through which the stem 40 passes and is rigidly connected to the stem by clamping nuts, one of which is the nut 51 adjacent the front face of the arm 106 and the other of which is a nut 51a adjacent the rear face of the arm 106, the nuts 51 and 51a cooperating with lock washers 51b interposed between them and the arm 106 and being in sufficiently tight relation to the arm 106 to insure its movement with the stem 40. The shoes 107 oppose resistance to the turning movement of the stem 40 in a degree such that the stem will be turned relatively slowly. In this way accuracy of the demonstration is promoted. The braking shoes 107 also hold the parts in any position to which they are moved by the tilting of the model sacrum. In this way the lamps which are dimmed in the course of such turning movement are conveniently maintained dimmed for such period as the demonstrator may deem suitable for the purposes of exhibition.

When it is desired to restore the lamps to full brilliance the sacrum is moved manually counter-clockwise. The switches 94 to 100 are self-operating in transferring the operation of the lamps from the low voltage circuits to the normal high voltage circuit, the succession of this transfer of course being in the reverse order, i. e. in the order of the lamps 54 to 60. The simultaneous glow of all of the lamps at full brilliance is indicative of the normal position of the model sacrum, at which time its manipulation is discontinued.

The current for the operation of the lamps is taken from the service line by a cord which may be plugged into a standard wall socket 108 carried by the panel 5 near its lower end. The socket 108 is connected by a wire 109 to a manually operated switch 110 and by a wire 111 to a transformer 112 which is connected by a wire 113 to the switch 110. When the switch 110 is closed current flows from the socket to the transformer, thence to the switch and from the switch to the socket.

The current for the high voltage and low voltage circuits of the lamps is supplied by the transformer 112 which may be of any standard construction having high and low voltage sides. The lamp circuits are completely shown in Figure 4 but may be more readily followed by reference to the simplified and larger scale diagrams of Figures 14 and 15 in which the circuits of but two of the lamps, e. g. the thyroid lamp 55 and the stomach lamp 57, are shown, it being understood that the hook-up of the remaining lamps is similar and that their circuits may be traced in the same manner.

The high voltage circuits are shown in Figure 14 and include a return wire 114 leading to the transformer 112 and which, being common to the high voltage and low voltage circuits, may be designated as a "neutral" wire. The normally closed, or "normal," high voltage circuit also includes a wire 112a which extends from the high voltage side of the transformer 112 and is connected by a wire 115 to the normal high voltage point 91a of the atlas-controlled micro-switch 91. The bulbs 68 of the several lamps 54 to 60 are connected in parallel, as by wires 117, to the neutral points of the corresponding vertebrae-controlled micro-switches 73 to 79, respectively, these points of the switches 74 and 76 being designated 74c and 76c respectively, and by wires 118 to the neutral wire 114. The sacrum-controlled micro-switches 94 to 100 correspond severally to the vertebrae-controlled switches 79 to 73, that is to say the switches 73 and 100 control the eye lamp 54, the switches 74 and 99 the thyroid lamp 55, the switches 75 and 98 the heart lamp 56, the switches 76 and 97 the stomach lamp 57, the switches 77 and 96 the pancreas lamp 58, the switches 78 and 95 the kidney lamp 59 and the switches 79 and 94 the bladder lamp 60. The corresponding micro-switches of the two series are severally connected by wires 119 which extend between the high voltage points of the series 73—79, these points of the switches 74 and 76 being designated 74a and 76a, and the neutral points of the series 94—100, these points of the switches 97 and 99 being designated 97c and 99c. The high voltage points of the switches 94 to 100, these points of the switches 97 and 99 being designated 97a and 99a, are severally connected to a wire 120 which extends to the neutral point 91c of the atlas-controlled micro-switch 91.

With all of the parts of the model spinal column in their normal positions the several micro-switches will complete the high voltage circuit of the lamps through the points above referred to and the lamps will glow at maximum brilliance. The normal high voltage circuit of the lamps may be traced as follows: From the transformer 112 through the wires 112a and 115 to the normal high voltage point 91a of the micro switch 91; through the micro-switch 91 (its movable contact being shown in full lines in normal high voltage circuit closing position) and from its neutral point 91c by the wire 120 to the high voltage points of the several micro-switches 94 to 100 (their movable contacts being shown in full lines in normal high voltage circuit closing positions); from the neutral points of these micro-switches by the several wires 119 to the high voltage points of the corresponding micro-switches 79 to 73 respectively; from the neutral points of the micro-switches 73 to 79 through the several wires 117, lamp bulbs 66 and wires 118 to the neutral wire 114; and thence back to the transformer 112. In the examples shown in Figure 14 the circuit of the lamp 55 includes the wire 119 which extends between the mirco-switches 99 and 74 and the circuit of the lamp 57 includes the wire 119 which extends between the micro-switches 97 and 76. With the demonstrating equipment in this condition, if any one (or more) of the model vertebrae be manipulated to demonstrate and symbolize the subluxation of the corresponding natural vertebra the particular corresponding switch of the series 73 to 79 will be operated to cut the bulb 66 of the lamp under its control from the normal high voltage circuit and into a local low voltage circuit in which the lamp glows with reduced brilliance as above generally explained and as will be later explained in full detail by reference to Figure 15. The dimming of such lamp or lamps does not affect the remaining lamps which will continue to glow with maximum brilliance in the normal high voltage circuit. In like manner if the model sacrum be manipulated the micro-switches 94 to 100, according to the degree of tilting of the model sacrum, will be successively operated to cut the lamps under their control, in the order of lamps 60 to 53, from the normal high voltage circuit into local low voltage circuits in which they glow with reduced brilliance as above generally explained and as will be lated explained in full detail by reference to Figure 15. The dimming of any of the lamps, less than the total number, by the tilting of the model sacrum does not affect the remaining lamp or lamps which will continue to glow with maximum brilliance in the normal high voltage circuit.

In the special atlas-controlled circuit above generally referred to shunt connections are substituted, so to speak, for the wire 115 and are provided between the transformer 112 and the atlas-controlled micro-switch 91. These connections include the rheostat 92 and otherwise consist of a wire 116 which extends from the wire 112a to the rheostat and a wire 121 which extends from the rheostat to the shunt point 91b of the atlas-controlled micro-switch 91. The shunt circuit is employed in connection with a branch circuit which includes the voltmeter 93 and consists of a wire 122 extending from the neutral point 91c of the atlas-controlled micro-switch 91 to one side of the voltmeter 93 and a wire 123 extending from the other side of the voltmeter to the wire 114.

With the demonstrating equipment in its normal condition, that is to say, with all of the lamps glowing at full brilliance in the normal high voltage circuit, the atlas, as above generally explained, may be manipulated to actuate the micro-switch 91 in order to cut the lamps from the normal high voltage circuit into the shunt or special circuit in connection with which the voltmeter 93 is utilized. Such manipulation of the atlas actuates the micro-switch 91, through the actuating arm 88, whereby the normal high voltage circuit is broken at the high voltage point 91a, and the shunt circuit is closed at the shunt point 91b. The movable contact of the micro-switch 91 is shown in full lines in its normal position wherein the normal high voltage circuit is closed and in broken lines in the position to which it is moved when the atlas is manipulated in order to close the shunt circuit. This shunt circuit may be traced as follows: From the transformer 112 through the wires 112a and 116 to one side of the rheostat 92; from the other side of the rheostat through the wire 121 to the shunt point 91b of the micro-switch 91; through the micro-switch 91 and from its neutral point 91c by the wire 120 to the high voltage points of the several micro-switches 94 to 100; through the micro-switches 94 to 100 and from their neutral points by the several wires 119 to the high voltage points of the corresponding micro-switches 79 to 73, respectively; from the micro-switches 73 to 79 through the several wires 117, lamp bulbs 66 and wires 118 to the neutral wire 114; and thence back to the transformer 112. The branch of the voltmeter circuit, as utilized in connection with the shunt circuit, may be traced as follows: From the transformer 112 through the wires 112a and 116 to one side of the rheostat 92; from the other side of the rheostat through the wire 121 to the shunt point 91b of the micro-switch 91; through the micro-switch 91 and from its neutral point 91c by the wire 122 to one side of the voltmeter 93; from the other side of the voltmeter by the wire 123 to the neutral wire 114; and thence back to the transformer.

The manually controlled rheostat 92 is fully open at the time the atlas is manipulated to cut in the shunt circuit whereby upon the initial closing of the shunt circuit all of the lamps glow with maximum brilliance and the voltmeter 93 (its branch wires being common both to the normal high voltage circuit and the shunt circuit) registers "100%", just as they did in the normal high voltage circuit. In order to demonstrate to the patient the adverse neurological effects upon the several body organs of pressure upon the spinal cord, resultant from a subluxation of the atlas, the rheostat is adjusted to reduce the voltage in a degree substantially proportionate to the impairment of the efficiency of the body organs as determined by a reading of an appropriate pathological instrument; and the degree to which the voltage is thus reduced is registered by the voltmeter 93, the current at all times being of equal value in the shunt circuit and the voltmeter branch. For example, if the impairment of the efficiency of the body organs is found to be of the order of forty per cent the rheostat will be adjusted to effect a forty per cent reduction of the voltage as indicated by a voltmeter reading of "60%".

The low voltage circuits are shown in Figure 15 and include the return wire 114. A wire 112b leads from the low voltage side of the transformer 112 and is connected to wires 124 and 125. The wire 124 is connected in parallel by wires 126 to the low voltage points of the several switches of the series 73 to 79, these points of the switches 74 and 76 being designated 74b and 76b. The wire 125 is similarly connected in parallel by wires 125a to the low voltage points of the several switches of the series 94 to 100, these points of the switches 97 and 99 being designated 97b and 99b.

Figure 15 shows one of the lamps in its local low voltage circuit and the other lamp in the normal high voltage circuit, the stomach lamp 57 being selected to typify the operation of any of the lamps in its local low voltage circuit and the thyroid lamp 55 being selected to typify the operation of the remaining lamps in the normal high voltage circuit. Figure 15, therefore, assumes an operative condition wherein the switch 76 which controls the lamp 57 has been operated by the manipulation of the model fifth dorsal vertebra 5D to cut the bulb 68 of the lamp 57 into its local low voltage circuit and the remaining parts of the model spinal column are in their normal positions whereby the bulbs of the remaining lamps, as typified by the lamp 55, continue their operation in the normal high voltage circuit as described in connection with Figure 14. In the illustration of the condition assumed by Figure 15 the prevailing positions of the movable contact elements of the switches 74, 76, 97 and 99 are shown in full lines. The low voltage circuit of the lamp 57 may be traced as follows: From the low voltage side of the transformer 112 by the wires 112b, 124 and 123 to the low voltage point 76b of the switch 76; through the switch and from its neutral point 76c by the wire 117 to the bulb 68 of the lamp 57; and thence by the wires 118 and 114 to the transformer 112. The low voltage circuits of the remaining lamps are open at the low voltage points of the remaining switches of the series 73 to 79 and the normal high voltage circuit of these lamps is closed at the high voltage points of these switches, this condition being typified in the case of the lamp 55 by the showing of its low voltage circuit as open at the low voltage point 74b of the switch 74 and its normal high voltage circuit as closed at the high voltage point 74a of the switch 74.

Figure 15 also shows the low voltage circuits which are under the control of the switches 94 to 100. These particular low voltage circuits are, however, completed through the high voltage points of the corresponding switches of the series 73 to 79. In the illustration of these low voltage circuits the movable contact elements of the switches selected for illustration, namely the switches 97 and 99, are shown in broken lines in their low voltage circuit closing positions and the movable contact element of the switch 76 is shown in broken lines in its normal position wherein it engages the high voltage contact point 76a of the switch 76. Figure 15 assumes a tilting of the model sacrum through a degree sufficient successively to operate the switches 94, 95, 96, 97, 98 and 99 to close the respective low voltage circuits under their control, the showing of the switches, in order to promote clarity of illustration, being limited to the switches 97 and 99 which control low voltage circuits of the respective lamps 57 and 55. Figure 15 also assumes that the movable contact elements of all of the switches of the series 73 to 79 are in their normal positions in which the normal high voltage circuit is closed (this position of the movable contact element of the switch 76, as above mentioned, being shown by broken lines) and that the movable contact elements of the switches 97 and 99 have been operated to cut in the low voltage circuits of the respective lamps 57 and 55, the movable contact elements of the switches 97 and 99, for the purpose of this assumption, being shown by broken lines in low voltage circuit closing positions.

The manipulation of the model sacrum 27 is preceded by the normal operative condition as described with reference to Figure 14, that is to say the condition wherein all of the parts of the model spinal column are in their normal positions and all of the lamps are in operation in the normal high voltage circuit and glow with maximum brilliance On the tilting of the model sacrum successively to operate the switches of the series 94 to 100 to cut in the low voltage lamp circuits under their respective control, the number of switches so operated depends on the degree to which the model sacrum is tilted. This operation of the switches of the series 94 to 100 involves the shifting of their movable elements from the high voltage points to the low voltage points, thereby breaking the normal high voltage circuit of the particular lamps affected and closing corresponding low voltage circuits. This is illustrated in Figure 15 in the case of the switches 97 and 99, the movable elements of which are shown in broken lines as shifted to the low voltage points 97b and 99b, respectively. The low voltage circuit of the lamp 57 under the control of the switch 97 may be traced as follows: From the transformer 112 by the wire 112b and the wire 125 to the low voltage point of the switch 97; through the switch 97, and from its neutral point 97c by the corresponding wire 119 to the high voltage point of the switch 76; through the switch 76, and from its neutral point, by the wire 117 to the bulb 68 of the lamp 57 and thence by the corresponding wire 118 and the neutral wire 114 back to the transformer. The low voltage circuit of the lamp 55 may be similarly traced through the switch 99, the corresponding wire 119 and the switch 74. All of the lamps which have thus been cut into the low voltage circuits by the tilting of the sacrum will simultaneously glow at half of their normal brilliance.

If the tilting of the model sacrum be of a degree less than that required for energizing the low voltage circuits of all of the lamps, that is to say for the low voltage conditioning of all of the switches of the series 94 to 100, the remaining lamp or lamps will continue in operation in the normal high voltage circuit and will continue to glow at maximum brilliance. In respect to Figure 15 it may be assumed that the tilting movement of the model sacrum has not been carried beyond the degree necessary for the low voltage conditioning of the micro-switches 94 to 99 in which case the microswitch 100 (not shown in Figure 15) will remain conditioned for operation in the normal high voltage circuit and the eye lamp 54 under its control will remain in operation in the normal high voltage circuit and will glow at maximum brilliance. In like manner if it be assumed, for example, that the model sacrum has not been tilted beyond the degree necessary for the low voltage conditioning of the micro-switch 97 the remaining switches of the series 94 to 100, i. e., the switches 98, 99 and 100, will remain conditioned for operation in the normal high voltage circuit and the lamps under their control, namely the heart lamp 56, the thyroid lamp 55 and the eye lamp 54, respectively, will continue in operation in the normal high voltage circuit and will glow at maximum brilliance.

In many cases it may be found desirable to hold the model atlas in a position in which the shunt circuit of the lamps is closed for a period during which the effects of spinal cord pressure may be explained to students or patients. In order that this may be done mechanically, thereby to relieve the demonstrator of the necessity of holding the atlas manually as in the form shown in Figure 5, the modified construction shown in Figure 16 may be employed.

In the modified construction a strap 127 is attached to the anterior face of the atlas by terminally located securing screws 128, the body of the strap otherwise being suitably spaced from the atlas. The strap directly effects the operative movement of an actuating arm 129 which corresponds functionally to the arm 88 of the form shown in Figure 5. In the modified construction, however, the actuating arm is required both to be connected to the atlas and to have a fulcrumed relation. For these purposes the strap is formed with a central opening 130 and the arm carries at its front end a sleeve 131 fixed to it by nuts 132 located adjacent opposite sides of the strap, the terminal portion of the arm being threaded to accommodate the nuts which are suitably tightened against the ends of the sleeve. The opening 130 is of suitably greater diameter than the sleeve 131 whereby the sleeve may have a loose fit in the opening with a resultant suitable measure of lateral play. The sleeve 131 therefore, in effect, provides a ball joint between the strap and the arm while at the same time it cooperates with the nuts 132 in the connection of the arm and the strap in a manner to prevent their separation.

The arm 129 extends through an opening 133 of suitably large diameter in the panel 5 and the portion of the arm which projects behind the panel normally has a median position between the movable button elements of the switches 73 and 91. Further support for the arm 129 is provided by a strap 134 secured to the rear face of the panel, extending across the opening 133, and having a central opening 135 through which the arm passes. The strap 134 provides additional fulcra for the arm 129 and for this purpose the diameter of the opening 135 is sufficiently greater than the diameter of the arm 129 to provide for a suitable measure of lateral play between the arm and the strap 134, the opposite sides of the opening 135 providing the fulcrum points. Behind the strap 134 the arm carries a sleeve 136 which provides a suitable measure of diametrical enlargement whereby, if for any reason the arm and the button elements of the switches 73 and 91 are not in ideal alinement, the arm will in any event engage such elements in its movement in one direction or the other.

In the modified construction the micro-switch 91x (which otherwise corresponds structurally and functionally to the switch 91 above described) is of the well known type wherein the movable contact element is automatically maintained in either of its circuit closing positions and a manually operated reset key is provided to return the movable contact element to its original or normal position, the construction being such that when the movable contact element is shifted from its original position the reset key is moved outward, manual pressure upon the reset key to push it inward effecting the return of the movable contact element to its original position. The reset key is known at 137 and projects from the side of the switch casing opposite the side from which the actuating button projects. Behind the panel 5 the arm 129, as viewed in plan, is of U-shape, that is to say it is provided at its rear end with a lateral extension 138 which terminates in a forward extension 139. The lateral extension 138 has support and guidance in a sleeve 140 through which it passes with a suitably loose fit, the sleeve 140 being carried by a bracket 141 which is suitably attached to the adjacent wall of the casing of the switch 91x and serving to prevent the arm 129 from turning about its axial center and also to prevent a substantial movement of the arm in the direction of its axial center. The extension 139 projects behind, and cooperates with, the reset key 137, for this purpose being preferably provided with a sleeve 142 which affords a suitable measure of diametrical enlargement, thereby to insure the proper engagement of the extension 139 and the key 137 under all conditions. It is preferred to provide positive support for the extension 139. For this purpose the panel 5 is provided adjacent its rear face with a recess 143 into which the end of the extension projects, the recess being of substantially greater diameter than the extension. The recess 143 is bridged by a plate 144 secured to the panel and formed with a slot 145 through which the extension 139 projects with a suitable loose fit, the lower wall of the slot providing support for the extension.

The arm 129 adjacent each end has two opposed fulcrum points, one pair, adjacent the outer end of the arm, provided by the opening 130 and the other pair, near the inner end of the arm, provided by the opening 135. According to the direction in which the model atlas 1C is tilted about its axis the arm 129 will swing about a pair of remote fulcrum points in one direction or the other. A tilting movement of the axis in the clockwise direction (which movement of course is of very slight degree) results in a lateral rocking movement of the arm in the counter-clockwise direction, and, conversely, a tilting movement of the axis in the counter-clockwise direction results in a lateral rocking movement of the arm in the clockwise direction.

In the manipulation of the atlas to cause the switch 73 to cut the eye lamp 54 into its local low voltage circuit the atlas is tilted counterclockwise whereupon the arm 129, rocking laterally clockwise, engages the button element of the switch 73 and pushes it inward. Following this operation, when the manual pressure upon the atlas is released, the atlas is returned to its normal position in the manner above described and the arm 129 is moved back into its normal position, as shown in Figure 16, in which it is normal to the strap 127 and the panel 5 and its part which projects behind the panel has a median position between the button elements of the switches 73 and 91x.

In the manipulation of the atlas to cause the switch 91x to open the normal high voltage circuits of the lamps and cut in the shunt circuit the atlas is tilted clockwise, whereupon the arm 129, rocking laterally counter-clockwise, engages the button element of the switch 91x and pushes it inward, the extensions 138 and 139 at the same time moving laterally toward the left, Figure 16 of the drawing being considered. When the button element of the switch 91x is thus pushed inward, the extension 139 at the same time moving to the left, the reset key 137 is projected and is held in projected relation until it is again pushed inward. The reset key 137 as projected engages the sleeve 142 and thereby holds the arm 129 in its leftward position, the atlas by reason of its connection to the arm 129 of course being held in its rightward position. Thereupon the rheostat 92 having been adjusted to dim the lamps to the degree determined upon, the lamps will glow continuously as thus dimmed for such a period as the demonstrator may deem suitable. When it is desired to restore the lamps to the normal high voltage circuit the demonstrator moves the atlas counterclockwise from its rightward position to its normal position as shown in Figure 16, such movement of the atlas returning the arm 129 to its normal position by a lateral rocking movement to the right and causing the extension 139, by means of its sleeve 142 to push the reset key 137 inward, thereby to operate the switch 91x to open the shunt circuit and close the normal high voltage circuit.

I claim:

1. Chiropractic demonstrating equipment comprising, in combination, a model spinal column including a displaceable first cervical model vertebra, a base, means for supporting the column in front of the base, a series of electrically illuminated lamps carried by the base, visual from its front, and severally representative of different organs of the body, a normally operative high voltage circuit for the simultaneous and uniform illumination of the several lamps, a second circuit for the simultaneous and uniform illumination of the several lamps, the second circuit being operative to effect a simultaneous reduction of the voltage uniformly for the several lamps, a switch common to all of the lamps controlling the operativeness of the circuits, normally conditioned to close the normal high voltage circuit and operable to close the second circuit, and actuating means operatively connecting the model first cervical vertebra and the switch whereby upon manual displacement of the model first cervical vertebra from its normal position the switch is operated to open the normally closed normal high voltage circuit and to close the second circuit.

2. Chiropractic demonstrating equipment as set forth in claim 1 wherein the second circuit is provided by a shunt line bridging the normally operative high voltage circuit and manually adjustable means is arranged in the shunt line for simultaneously and uniformly dimming the illumination of the several lamps in any determined degree.

3. Chiropractic demonstrating equipment comprising, in combination, a model spinal column composed of articulated and individually displaceable model vertebrae, a base, means for supporting the column in front of the base, a series of electrically illuminated lamps carried by the base, visual from its front and severally representative of different organs of the body, a normally operative high voltage circuit for the simultaneous and uniform illumination of the several lamps, a second circuit for the simultaneous and uniform illumination of the several lamps, the second circuit being operative to effect a simultaneous reduction of the voltage uniformly for the several lamps, low voltage circuits severally local to the lamps, a series of switches, one for each lamp, included in the normal high voltage circuit and the low voltage circuits and normally operative to close the normally operative high voltage circuit, the switches being selectively and individually operable to close the low voltage circuits which they respectively control, an actuating means for each switch, the several actuating means being severally under the control of selected model vertebrae, means for maintaining the selected model vertebrae in normal positions simulative of the normal positions of natural vertebrae and wherein the switches close the normally operative high voltage circuits, each actuating means being operable by the manual displacement of its controlling model vertebra to cause its associated switch to open the high voltage circuit and close the low voltage circuit of the lamp which it controls, a switch common to the several lamps and controlling the operativeness of the normally operative high voltage circuit and of the second circuit and actuating means operatively connecting the model first cervical vertebra and the switch common to the several lamps whereby upon manual displacement of said first cervical vertebra from its normal position the switch common to the several lamps is operated to open the normally operative high voltage circuit and to close the second circuit.

4. Chiropractic demonstrating equipment as set forth in claim 3 wherein the second circuit is provided by a shunt line bridging the normally operative high voltage circuit and manually adjustable means is arranged in the shunt line for simultaneously and uniformly dimming the illumination of the several lamps in any determined degree.

5. Chiropractic demonstrating equipment comprising, in combination, a model spinal column terminating at its lower end in an articulated and individually displaceable model sacrum, a base, means for supporting the column in front of the base, a series of electrically illuminated lamps carried by the base, visual from its front and severally representative of different organs of the body, a normally operative high voltage lamp illuminating circuit, low voltage circuits severally local to the lamps, a series of switches, one for each lamp, included in the circuits and normally operative to close the normally operative high voltage circuit, and actuating means for the switches connected to and operatively movable with the model sacrum as tilted in either direction, the actuating means being arranged when the sacrum is tilted in one direction from its normal position to operate the switches in a prescribed order of succession whereby the switches successively cut the lamps from the normally operative high voltage circuit and in the same order of succession close the low voltage circuits, and when the sacrum is tilted in the opposite direction back to its normal position successively to condition the switches in the reverse order of succession to open the local low voltage circuits and cut the lamps into the normally operative high voltage circuit.

6. Chiropractic demonstrating equipment as set forth in claim 5 wherein the actuating means for the switches consists of an element rigidly connected to the sacrum and rotatably movable with it as tilted, the element projecting through an opening in the panel and having a portion extending behind the panel, a plate fixedly mounted upon the element and posts projecting from the plate for engagement severally with the movable elements of the switches, the posts being spaced from the movable elements of the switches by successive increments in the order in which the switches are to be actuated to close the low voltage circuits.

7. Chiropractic demonstrating equipment comprising, in combination, a model spinal column composed of articulated and individually displaceable model vertebrae and terminating at its lower end in an articulated and individually displaceable model sacrum, a base, means for supporting the column in front of the base, a series of electrically illuminated lamps carried by the base, visual from its front and severally representative of different organs of the body, a normally operative high voltage lamp illuminating circuit, a series of low voltage circuits severally local to the lamps, a series of switches, one for each lamp, included in the circuits and normally operative to close the normally operative high voltage circuit, the switches being selectively and individually operable to close the low voltage circuits which they respectively control, an actuating means for each switch, the several actuating means being severally under the control of selected model vertebrae, means for maintaining the selected model vertebrae in normal positions simulative of the normal positions of natural vertebrae and wherein the switches close the normally operative high voltage circuit, each actuating means being operable by the manual displacement of its model controlling vertebra to cause its associated switch to open the high voltage circuit and close the low voltage circuit of the lamp which it controls, a second series of low voltage circuits severally local to the lamps, a second series of switches, one for each lamp, included in the circuits and normally operative to close the normally operative high voltage circuit, and actuating means for the switches of the second series connected to and operatively movable with the model sacrum as tilted in either direction, the actuating means being arranged when the sacrum is tilted in one direction from its normal position to operate the switches of the second series in a prescribed order of succession whereby they successively cut the lamps from the normally operative high voltage circuit and in the same order of succession close the low voltage circuits of the second series and when the sacrum is tilted in the opposite direction back to its normal position to condition the switches of the second series in the reverse order of succession to open the low voltage circuits of the second series and cut the lamps into the normally operative high voltage circuit.

8. Chiropractic demonstrating equipment comprising, in combination, a model spinal column composed of articulated and individually displaceable model vertebrae normally maintained in positions simulative of the normal positions of the natural vertebrae and terminating at its lower end in an articulated and individually displaceable model sacrum, a base, means for supporting the column in front of the base, a series of electrically illuminated lamps carried by the base, visual from its front and severally representative of the different organs of the body, a normally operative high voltage circuit for the simultaneous and uniform illumination of the several lamps, a second circuit for the simultaneous and uniform illumination of the several lamps, the second circuit being operative to effect a simultaneous reduction of the voltage uniformly for the several lamps, a switch controlling the operativeness of the circuits and normally conditioned to close the high voltage circuit, the switch being manually operable to open the normally closed high voltage circuit and to close the second circuit, a series of low voltage circuits severally local to the lamps, a series of switches, one for each lamp, included in the circuits and normally operative to close the normally operative high voltage circuit, the switches being selectively and individually operable to close the low voltage circuits which they respectively control, an actuating means for each switch, the several actuating means being severally under the control of selected model vertebrae, means for maintaining the selected model vertebrae in normal positions simulative of the normal positions of natural vertebrae and wherein the switches close the normally operative high voltage circuit, each actuating means being operable by the manual displacement of its model controlling vertebra to cause its associated switch to open the high voltage circuit and close the low voltage circuit of the lamp which it controls, a second series of low voltage circuits severally local to the lamps, a second series of switches, one for each lamp, included in the circuits and normally operative to close the normally operative high voltage circuit, and actuating means for the switches of the second series connected to and operatively movable with the model sacrum as tilted in either direction, the actuating means being arranged when the sacrum is tilted in one direction from its normal position to operate the switches of the second series in a prescribed order of succession whereby they successively cut the lamps from the normally operative high voltage circuit and in the same order of succession close the low voltage circuits of the second series and when the sacrum is tilted in the opposite direction back to its normal position to condition the switches of the second series in the reverse order of succession to open the low voltage circuits of the second series and cut the lamps into the normally operative high voltage circuit.

9. Chiropractic demonstrating equipment as set forth in claim 5 wherein the actuating means for the switches consists of an element rigidly connected to the sacrum and rotatably movable with it as tilted, the element projecting through an opening in the panel and having a portion extending behind the panel, a plate fixedly mounted upon the element and posts projecting from the plate for engagement severally with the movable elements of the switches, the posts being spaced from the movable elements of the switches by successive increments in the order in which the switches are to be actuated to close the low voltage circuits, and wherein an arm is fixedly mounted upon an element and is provided with frictional braking shoes and a plate is secured to the panel for engagement by the shoes, the plate and the shoes cooperating to resist the tilting movement of the sacrum and to hold the sacrum in any position to which it may be tilted.

10. Chiropractic demonstrating equipment comprising, in combination, a model spinal column composed of articulated and individually displaceable model vertebrae, a base, means for supporting the column in front of the base, a series of electrically illuminated lamps carried by the base, visual from its front end severally representative of different organs of the body, a normally operative high voltage lamp illuminated circuit, low voltage circuits severally local to the lamps, a series of switches, one for each lamp, included in the circuits and normally operative to close the normally operative high voltage circuit, the switches being selectively and individually operable to close the local low voltage circuits which they respectively control, an actuating means for each switch, the several actuating means being severally under the control of selected model vertebrae, means for maintaining the selected model vertebrae in normal positions simulative of the normal positions of natural vertebrae and wherein the switches close the normally operative high voltage circuit, each actuating means being operable by the manual displacement of its controlling model vertebrae to cause its associated switch to open the high voltage circuit and close the low voltage circuit of the lamp which it controls, a second circuit for the simultaneous and uniform illumination of the several lamps, the second circuit being operative to effect a simultaneous reduction of the voltage uniformly for the several lamps, a switch common to all of the lamps controlling the operativeness of the circuits, normally conditioned to close the normal high voltage circuit and operable to close the second circuit, one of the switches of the series being arranged in juxtaposed relation to the common switch, and actuating means operatively connecting the model first cervical vertebrae and the juxtaposed switches whereby upon manual displacement of the model first cervical vertebra in one direction from its normal position the switch of the series is operated to cut in the low voltage circuit of its controlling lamps and upon the manual displacement of the model first cervical vertebra in the opposite direction from its normal position the common switch is operated to open the normally closed high voltage circuit and to close the second circuit.

11. Chiropractic demonstrating equipment as set forth in claim 10 wherein manually releasable means is provided for holding the first cervical vertebra in the position in which it closes the second circuit, the holding means being responsive to manual pressure applied to the first cervical vertebra to permit the manual return of the first cervical vertebra to its normal position wherein the normally operative high voltage circuit is closed and consisting of a reset key in engagement with the actuating means associated with the first cervical vertebra, the reset key being projected when the first cervical vertebra is moved to cause the common switch to close the second circuit and being returned by the actuating means to its normal position in which it operates the common switch to close the normally operative high voltage circuit when the first cervical vertebra is moved by manual pressure to its normal position.

VICTOR S. CONSCHAFTER.

REFERENCES CITED

The following references are of record in the file of this patent:

UNITED STATES PATENTS

| Number | Name | Date |
| --- | --- | --- |
| 979,147 | Fryette | Dec. 20, 1910 |
| 983,547 | Fleck | Feb. 7, 1911 |
| 1,343,141 | Kenagy | June 8, 1920 |
| 1,581,736 | Hassler | Apr. 20, 1926 |
| 2,021,566 | Millard | Nov. 19, 1935 |
| 2,103,021 | Salsman | Dec. 21, 1937 |
| 2,108,229 | Metz | Feb. 15, 1938 |
| 2,197,975 | Fleet | Apr. 23, 1940 |
| 2,402,312 | Burch | June 18, 1946 |

FOREIGN PATENTS

| Number | Country | Date |
| --- | --- | --- |
| 147,832 | Switzerland | Sept. 16, 1931 |
| 605,262 | Germany | Nov. 8, 1934 |